United States Patent
Hargens et al.

(10) Patent No.: US 7,849,170 B1
(45) Date of Patent: Dec. 7, 2010

(54) DYNAMICALLY PROVIDING COMMUNICATION ACCOUNTS USING A COMMUNICATION ACCOUNT SYSTEM

(75) Inventors: Michael K. Hargens, Kansas City, MO (US); Jo Temming, Overland Park, KS (US)

(73) Assignee: Sprint Communications Company L.P., Overland, KS (US)

( * ) Notice: Subject to any disclaimer, the term of this patent is extended or adjusted under 35 U.S.C. 154(b) by 1162 days.

(21) Appl. No.: 09/628,831

(22) Filed: Jul. 31, 2000
(Under 37 CFR 1.47)

(51) Int. Cl.
*G06F 15/16* (2006.01)

(52) U.S. Cl. .......................... 709/223; 709/203; 705/1; 705/17; 705/40; 705/44; 705/77

(58) Field of Classification Search ................ 709/203, 709/204, 1, 17, 40, 4, 223; 705/1, 17, 40, 705/44, 77
See application file for complete search history.

(56) References Cited

U.S. PATENT DOCUMENTS

| | | | | |
|---|---|---|---|---|
| 5,627,886 A * | 5/1997 | Bowman | ................ | 379/111 |
| 5,991,380 A * | 11/1999 | Bruno et al. | ........... | 379/114.15 |
| 5,991,381 A * | 11/1999 | Bouanaka et al. | ...... | 379/114.15 |
| 5,991,413 A | 11/1999 | Arditti et al. | | |
| 6,009,156 A * | 12/1999 | Cross | .................... | 379/114.26 |
| 6,047,270 A * | 4/2000 | Joao et al. | ...................... | 705/44 |
| 6,081,703 A | 6/2000 | Hallqvist | | |
| 6,160,874 A * | 12/2000 | Dickerman et al. | ..... | 379/114.19 |
| 6,185,545 B1 * | 2/2001 | Resnick et al. | ................. | 705/40 |
| 6,188,752 B1 * | 2/2001 | Lesley | .................... | 379/114.16 |
| 6,226,364 B1 * | 5/2001 | O'Neil | .................... | 379/114.2 |
| 6,295,345 B1 * | 9/2001 | Pullen et al. | ........... | 379/114.28 |
| 6,333,976 B2 * | 12/2001 | Lesley | .................... | 379/114.01 |
| 6,366,664 B1 * | 4/2002 | Pullen et al. | ................. | 379/237 |
| 6,393,112 B1 * | 5/2002 | Gottlieb et al. | ........ | 379/112.01 |
| 6,424,706 B1 * | 7/2002 | Katz et al. | ............. | 379/144.01 |
| 6,480,588 B1 * | 11/2002 | Donovan | .................. | 379/114.2 |
| 6,480,710 B1 * | 11/2002 | Laybourn et al. | ........... | 455/406 |
| 6,501,837 B1 * | 12/2002 | Adler et al. | ............. | 379/210.01 |
| 6,505,171 B1 * | 1/2003 | Cohen et al. | ................... | 705/26 |
| 6,516,056 B1 * | 2/2003 | Justice et al. | ................ | 379/145 |
| 6,529,504 B1 * | 3/2003 | Sbisa | ........................ | 370/385 |
| 6,535,727 B1 * | 3/2003 | Abbasi et al. | ................ | 455/406 |
| 6,553,353 B1 * | 4/2003 | Littlejohn | .................... | 705/412 |
| 6,571,256 B1 * | 5/2003 | Dorian et al. | ............ | 707/104.1 |
| 6,587,867 B1 * | 7/2003 | Miller et al. | ................. | 709/200 |
| 6,625,439 B2 * | 9/2003 | Laybourn et al. | ........... | 455/407 |
| 6,658,455 B1 * | 12/2003 | Weinman, Jr. | .............. | 709/203 |

(Continued)

FOREIGN PATENT DOCUMENTS

WO    WO 98/18251    4/1998

(Continued)

*Primary Examiner*—Alina N. Boutah (57) ABSTRACT

A communication account system for dynamically providing communication accounts to communication devices for immediate transfer to users. The communication account system comprises a communication account server and an interface system coupled to the communication account server. The communication account server is configured to validate a communication device in response to a communication account request message from the communication device, associate a communication account with the communication device in response to the validation, and generate a response message indicating the communication account in response to the association. The interface system is configured to receive the first message from the communication device and transfer the second message to the communication device for the communication account server.

20 Claims, 8 Drawing Sheets

U.S. PATENT DOCUMENTS

| | | | |
|---|---|---|---|
| 6,760,418 B1* | 7/2004 | Abbasi et al. | 379/115.01 |
| 6,847,708 B1* | 1/2005 | Abbasi et al. | 379/114.2 |
| 6,937,593 B1* | 8/2005 | Gunasekar et al. | 370/352 |
| 7,039,040 B1* | 5/2006 | Burg | 370/352 |
| 7,191,153 B1* | 3/2007 | Braitberg et al. | 705/51 |
| 7,236,950 B2* | 6/2007 | Savage et al. | 705/34 |
| 2001/0046283 A1* | 11/2001 | Bouffard et al. | 379/114.2 |
| 2002/0026394 A1* | 2/2002 | Savage et al. | 705/34 |
| 2002/0046255 A1* | 4/2002 | Moore et al. | 709/218 |
| 2002/0161676 A1* | 10/2002 | Vadlamani | 705/30 |
| 2003/0009439 A1* | 1/2003 | Lee | 707/1 |

FOREIGN PATENT DOCUMENTS

| | | | |
|---|---|---|---|
| WO | WO 99/01969 | | 1/1999 |
| WO | WO 99/25106 | * | 5/1999 |

\* cited by examiner

DYNAMICALLY PROVIDING COMMUNICATION ACCOUNTS USING A COMMUNICATION ACCOUNT SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication systems, and specifically, to a communication account system that dynamically provides individual communication accounts to communication devices for transfer to users.

2. Description of the Prior Art

It is known in the art of telecommunications to provide calling card accounts to customers over the Internet. Since these accounts are purchased on-line, a customer generally does not receive a physical card. Rather, the customer receives account information in the form of a personal identification number ("PIN") and a toll free access number that allows the customer to utilize the account. These accounts are generally one of two types. A pre-paid account is an account with a pre-defined amount of usage paid for in advance by the customer. A usage-based account is an account that is billed on a periodic billing cycle according to the usage during the billing period.

To purchase an account, a customer connects to a service provider's website and places an order. The communication account information is then delivered to the customer using one of several methods depending on the type of order, type of customer, and the service provider. Where only a single account is purchased, the service provider typically presents the account information on the customer's computer display. In the case of a bulk purchase, often used by business customers, the service provider presents the account information via a computer disk or email. Upon purchasing the calling card accounts, a customer is free to use the account as they choose. For example, a business customer could purchase a batch of pre-paid accounts to provide as a promotion to its own customers. As an example, the business could provide a complimentary promotional account to its own customers in response to a transaction with the business's own website.

Unfortunately, the transmission and management of large batches of calling card accounts over the Internet is problematic for both the service provider and the customer. The service provider must generate, manage, and provide in a secure manner large quantities of account information to multiple customers. On the other hand, the customer upon receiving the account information must manage and store the accounts in a secure manner until they are exhausted. In addition, because pre-paid accounts often expire after a pre-determined time period, the customer must accurately forecast its calling account requirement to avoid shortages or premature expiration.

SUMMARY OF THE INVENTION

The present invention advances the art by providing a communication account system configured to dynamically provide communication accounts to communication devices for immediate transfer to users. A first advantage of the present invention is that the requesting communication device could be an internet device such as a web server, a wireless device, or a wireline device. A second advantage of the present invention is that the communication account could be any type of communication account provided by a service provider. A third advantage of the present invention is that the communication account system generates and provides individual communication accounts to the requesting device on demand, thus eliminating the requirement for customers to purchase and manage large batches of communication accounts. A fourth advantage of the present invention is that the communication account system provides various types of communication accounts to various types of devices for immediate transfer to users of those devices.

The communication account system comprises a communication account server coupled to an interface system. The communication account server is configured to receive a communication account request message from the communication device, validate the communication device, and associate a communication account with the communication device in response to the validation. The communication account server then generates and provides a response message indicating the communication account information to the communication device. The interface system is configured to receive the communication account request message from the communication device and provide the response message to the communication device for the communication account server.

In the context of the present invention, a wireline account is defined as any account that provides access to and usage of a wireline network. A wireless account is any account that provides access to and usage of a wireless network, and an internet account is any account that provides access to and usage of an internet.

DETAILED DESCRIPTION OF THE PREFERRED EMBODIMENT

Network Configuration and Operation FIGS. 1-6

Figure 1:
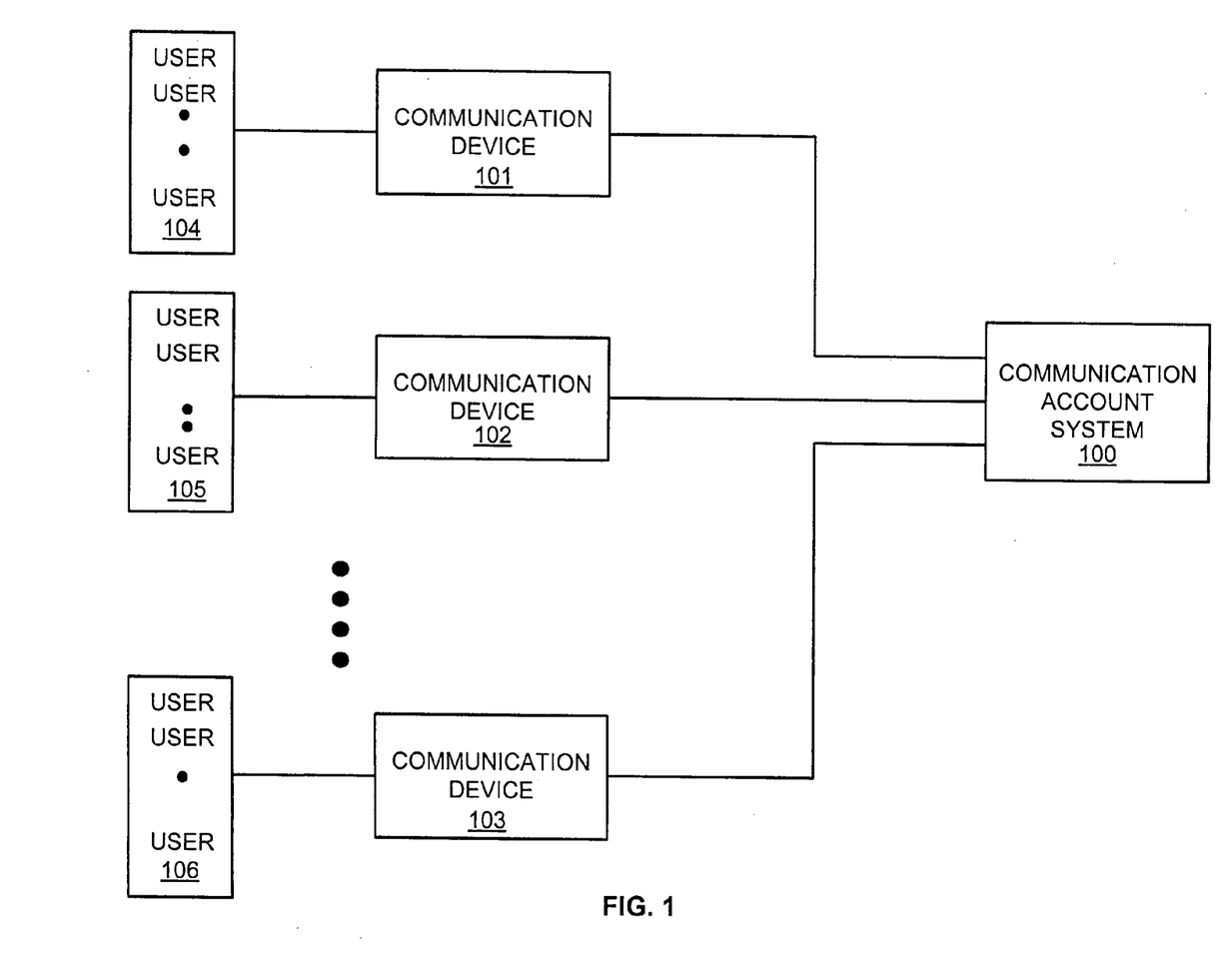
FIG. 1 illustrates an example of a network architecture according to the present invention.

FIG. 1 illustrates an example of a network architecture for a communication account system according to the present invention. FIG. 1 depicts users 104, 105, and 106, communication devices 101, 102, and 103, and a communication account system 100. The communication device 101 is connected to the users 104 and to the communication account system 100. The communication device 102 is connected to the users 105 and to the communication account system 100. The communication device 103 is connected to the users 106 and to the communication account system 100.

The communication account system 100 could be any communication system that receives communication account request messages from the communication devices 101, 102, and 103 and processes individual communication account request messages to: 1) validate the requesting communication device, 2) associate a communication account with the requesting communication device in response to the validation, and 3) generate a response message for the communication device indicating the communication account information in response to the association.

The communication accounts could be any type of communication account offered by a service provider. Some examples of the communication accounts include without limitation, a wireline account, a wireless account, or an internet account. The communication account information could be any information that provides access to and usage of the communication account. An example of communication account information for a wireline account could be a toll free access number and PIN that provides access and usage of a wireline network. An example of communication account information for a wireless account could be an access number and PIN that provides access to and usage of a wireless network. An example of communication account information for an internet account could be an access number to an internet service provider ("ISP") and password that provides access to and usage of an internet.

Communication devices 101, 102, and 103 could be any communication devices configured to generate the communication account request message, receive the response message indicating the communication account information, and provide the communication account information to the users 104, 105, and 106. Some examples of the communication devices include without limitation, a web server, a wireless device, and a wireline device.

Figure 2:
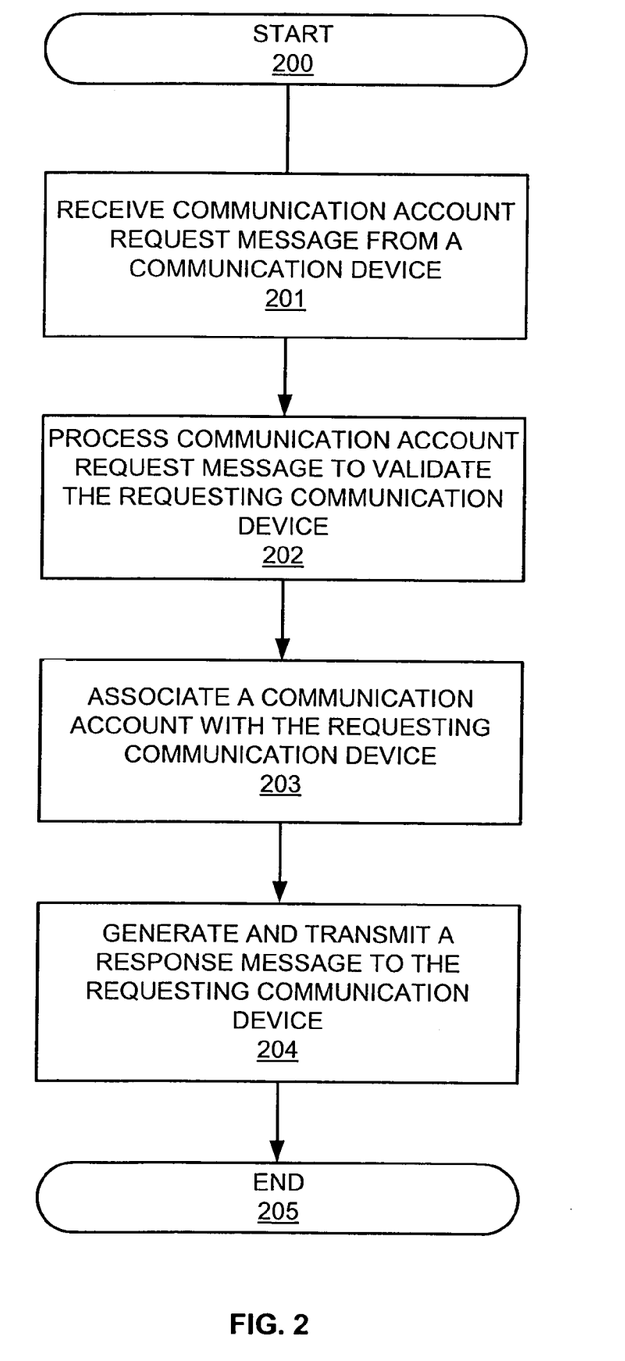
FIG. 2 is a flow chart illustrating an example of the operational steps of a communication account system according to the present invention.

FIG. 2 is a flow chart illustrating an example of the operation of the communication account system 100 according to the present invention. On FIG. 2 the operation begins at step 200. At step 201, the communication account system 100 receives a communication account request message from one of the communication devices 101, 102, or 103. At step 202, the communication account system 100 processes the communication account request message to validate the requesting communication device e.g. 101. The validation process could be any process where the communication account system 100 confirms that the requesting communication device 101 is a legitimate client. In some examples of the present invention, the validation process could comprise a comparison of an identification associated with the communication device 101 against a list of valid communication device identifications. Responsive to validating the communication device 101 the communication account system 100 associates a communication account with the requesting communication device 101 at step 203. The association process could be any process where the communication account system 100 determines a type of communication account that should be provided and selects that account type from a plurality of available account types for the requesting communication device 101. Responsive to associating a communication account with the communication device 101, the communication account system 100 generates and transmits a response message to the requesting communication device 101 at step 204, and the operation ends at step 205. The response message for the communication device 101 includes the communication account information for the communication device 101.

Figure 3:
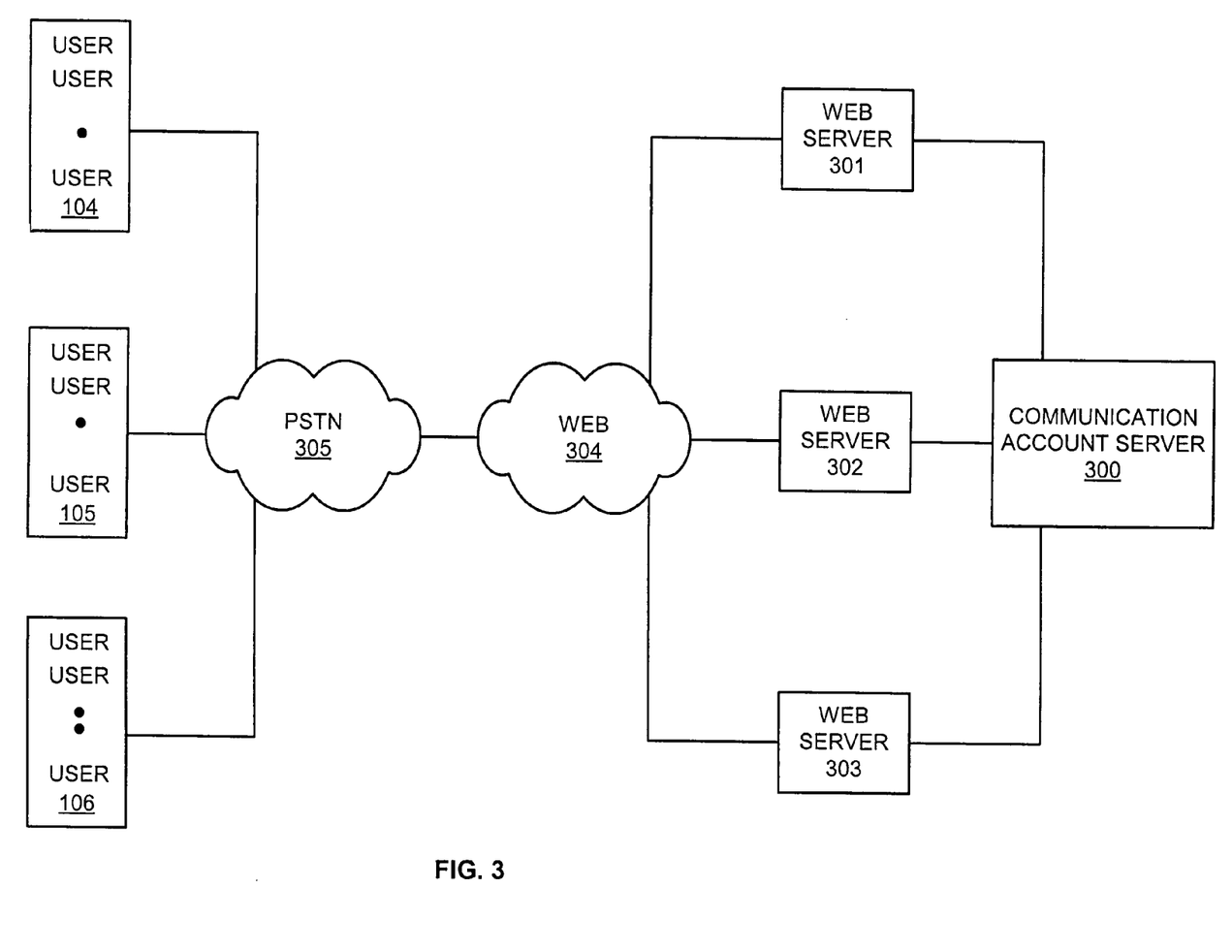
FIG. 3 illustrates another example of a network architecture according to the present invention.

FIG. 3 illustrates another example of a network architecture for a communication account system 300 of the present invention. Those skilled in the art will appreciate numerous variations that do not depart from the present invention. Those skilled in the art will also appreciate that various features described below could be combined with the above described embodiment to form multiple variations of the invention.

FIG. 3 depicts users 104, 105, and 106, web servers 301, 302, and 303, a public switched telephone network (PSTN) 305, a world wide web (web) 304, and a communication account system 300. The web server 301 is connected to the web 304 and to the communication account system 300. The web server 302 is connected to the web 304 and to the communication account system 300. The web server 303 is connected to the web 304 and to the communication account system 300. The PSTN 305 is connected to the web 304 and to the users 104, 105, and 106.

The communication account system 300 could be any communication system that receives communication account request messages from the web servers 301, 302, and 303 and processes individual communication account request messages to: 1) validate the requesting web server, 2) associate a communication account with the requesting web server in response to the validation, and 3) generate a response message for the web server indicating communication account information in response to the association.

The users 104, 105, and 106 are customers of the web servers 301, 302, and 303. The users 104, 105, and 106 access the web servers 301, 302, and 303 in a conventional manner such as by a web browser resident on the users terminal device that initiates a connection over the PSTN 305 with an ISP.

Figure 4:
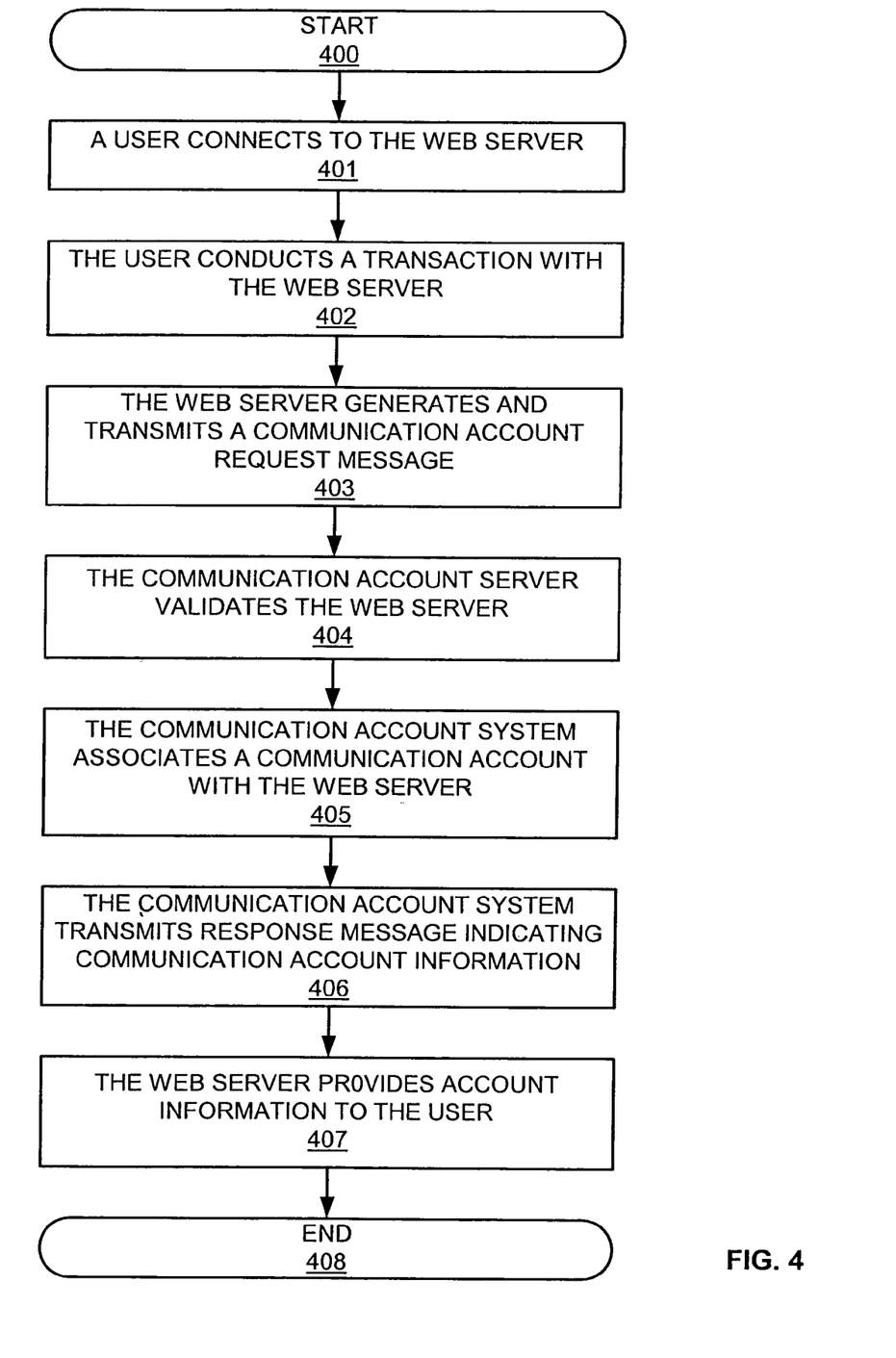
FIG. 4 is a flow chart illustrating another example of the operational steps of a communication account system according to the present invention.

FIG. 4 is a flow chart illustrating an example of the operation of the communication account system 300 according to the present invention. In this example, the web server 301 is hosting a promotion where it is configured to provide a promotional pre-paid calling card account to its users in response to a transaction with the web server 301. The transaction could be any transaction chosen by the operators of the web server 301 that triggers the promotion and the need for the promotional calling card account.

On FIG. 4 the operation begins at step 400. At step 401, a user e.g. 104 connects to the web server 301. At step 402, the user 104 conducts a transaction with the web server 301 that triggers the promotion and the requirement for the promotional calling card account. In response to the transaction, the web server 301 generates and transmits a communication account request message for the communication account system 300 at step 403. The communication account system 300 receives the communication account request message and processes the message to validate the web server 301 at step

404. The validation process includes performing a lookup operation that compares an address identification associated with the web server 301 with a list of valid web server address identifications. Responsive to an affirmative validation, the communication account system 300 processes the communication account request message to associate a communication account with the web sever 301 at step 405. In some examples of the invention, the type of communication account associated with the web server 301 is determined by a service agreement between the web server 301 and the communication account system 300. In other examples of the invention, the communication account system 300 could be configured to determine the type of communication account to associate with the web server 301 based on user information provided in the communication account request message by the web server 301. In this case the user information could include various types of information with some examples including but not limited to, the type of transaction conducted by the user 104, the monetary value of the transaction, and the identification of the user 104.

During the association process the communication account system 300 could process the user information to provide various types of communication accounts as a function of the user information provided. For example, the communication account system 300 could associate different accounts for different transactions. As one example, the communication account system 300 could associate a calling card account for a purchase transaction and a wireless account for a user that completes a survey. The communication account system 300 could also associate different account values based on the user information. As one example, the communication account system 300 could associate a 10 minute pre-paid calling card account for a purchase transaction up to $50.00 and associate a 20 minute pre-paid calling card account for a purchase transaction exceeding $50.00.

The communication account system 300 could also store the user information in a record and use the record to determine the type and value of communication account to associate. As one example, the communication account system 300 could associate a 5 minute pre-paid calling card account subsequent to a first transaction with the web server 301, and associate a 10 minute pre-paid calling card account subsequent to a second transaction by the same user with the web server 301. As another example, the communication account system 300 could associate an account only to first time users. In this case the communication account system 300 could use the stored information to determine if a current user is a first time user.

The communication account system 300 could also store a record associated with the web server 301. The communication account system 300 could use the record to track accounts associated with the web server 301 and generate billing and reporting information for the web server 301. As one example, the communication account system 300 could provide reporting information on the total number of users who purchased specific products or services from the web server. As another example, the communication account system 300 could provide reporting information on the peak traffic times, and the number of customers conducting different transactions with the web server 301.

Responsive to associating the communication account, the communication account system 300 transmits a response message to the web server 301 indicating the account information at step 406. The web server 301 then provides the account information to the user at step 407 and the process ends at step 408.

Figure 5:
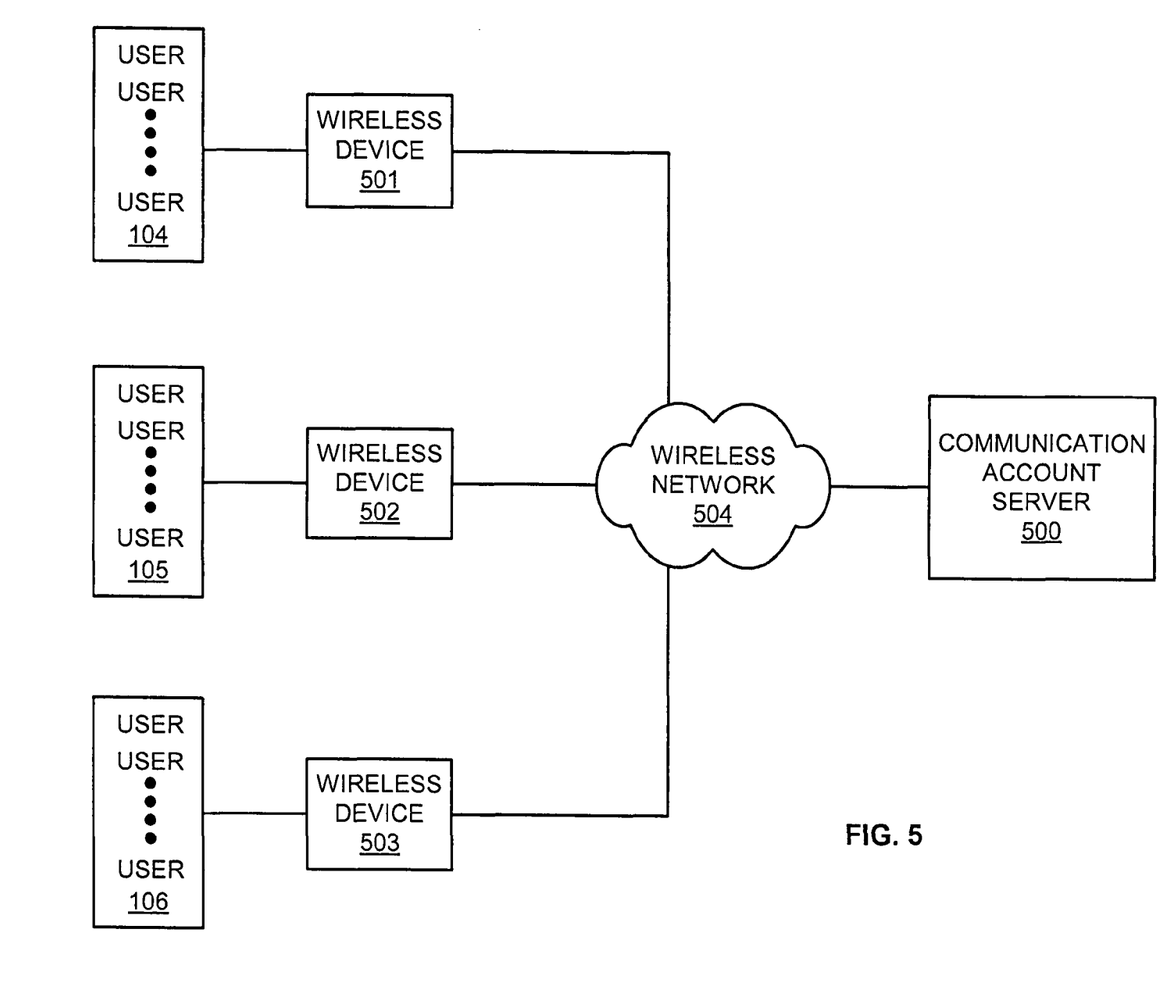
FIG. 5 illustrates another example of a network architecture according to the present invention.

FIG. 5 illustrates another example of a network architecture for a communication account system 500 according to the present invention. Those skilled in the art will appreciate numerous variations that do not depart from the present invention. Those skilled in the art will also appreciate that various features described below could be combined with the above described embodiment to form multiple variations of the invention.

FIG. 5 depicts users 104, 105, and 106, wireless devices 501, 502, and 503, a wireless network 504, and a communication account system 500. The wireless device 501 is connected to the wireless network 504 and the users 104. The wireless device 502 is connected to the wireless network 504 and the users 105. The wireless device 503 is connected to the wireless network 504 and the users 106. The wireless network 504 is connected to the communication account system 500.

The communication account system 500 could be any communication system that dynamically provides communication accounts to wireless devices 501, 502, and 503 for immediate transfer to users 104, 105, and 106. The communication account system 500 receives communication account request messages from the wireless devices 501, 502, and 503 and processes the communication account request messages to: 1) validate the requesting wireless device, 2) associate a communication account with the requesting wireless device in response to the validation, and 3) generate a response message for the wireless device indicating the communication account information in response to the association.

The wireless devices 501, 502, and 503 exchange wireless signals over an air interface with the wireless network 504. The wireless devices 501, 502, and 503 could be any devices configured to generate and transmit the communication account request messages, receive the response message from the communication account server 500, and provide the communication account information to the users 104, 105, or 106.

Figure 6:
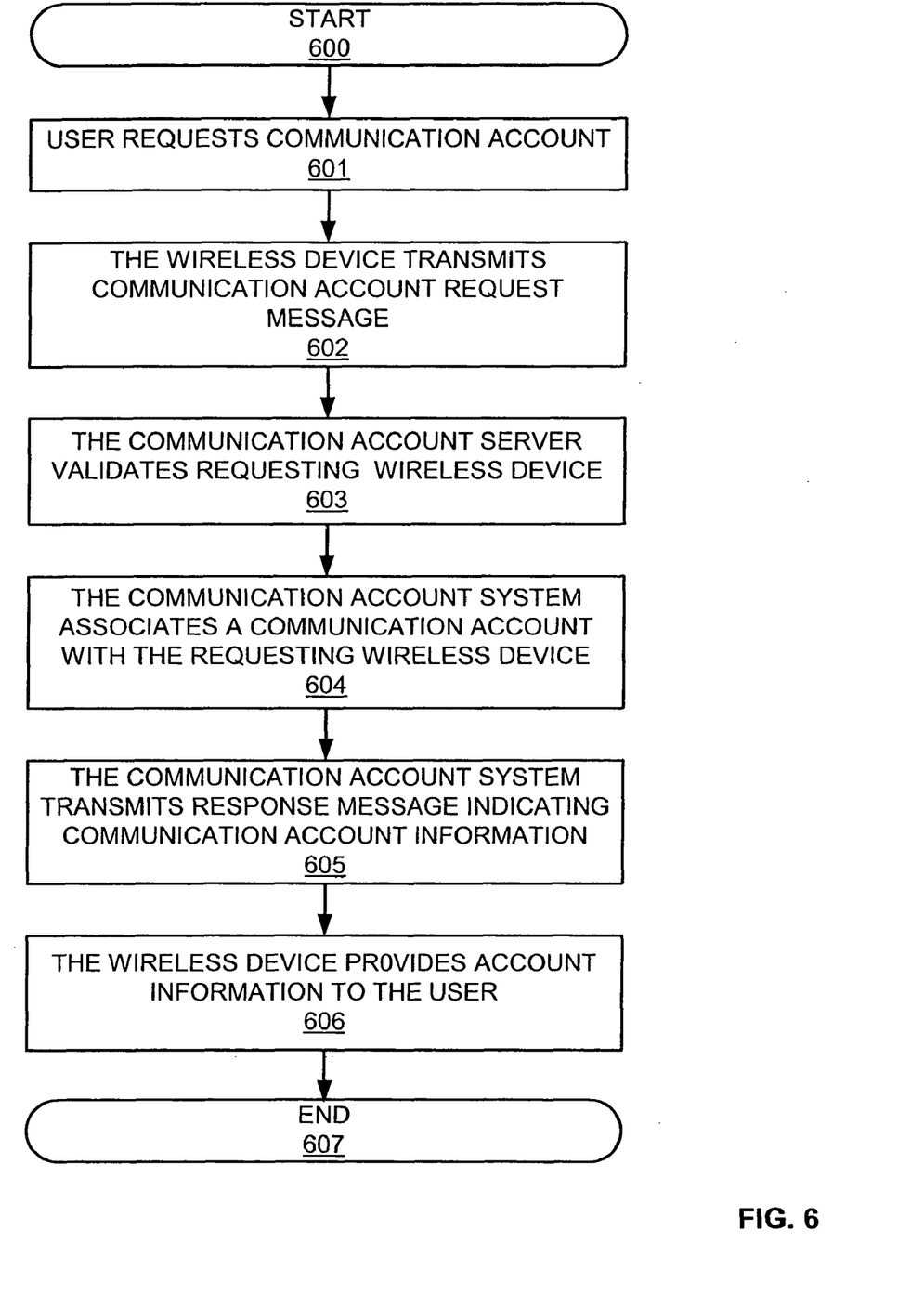
FIG. 6 is a flow chart illustrating another example of the operational steps of a communication account system according to the present invention.

FIG. 6 is a flow chart illustrating an example of the operation of the communication account system 500 according to the present invention. In this example, the wireless device 501 could be a device configured to distribute a communication account in response to a request from the user 104. The wireless device 501 could be located anywhere that communication can be established with the wireless network 504. As an example, the wireless device 501 could be located in a retail store and function similar to an automated teller machine. The wireless device 502 could be used to distribute promotional communication accounts. In this case the user 105 is the promotion sponsor and the wireless device 502 is used to obtain the communication accounts for the promotion customers. The communication account system 500 could provide the communication account according to the following method.

On FIG. 6 the operation begins at step 600. At step 601, the user 104 or the user 105 requests a communication account using the wireless device 501 or 502 respectively. In response to the request, the respective wireless device 501 or 502 generates and transmits a communication account request message to the communication account server 500 via the wireless network 504 at step 602. The communication account system 500 receives the communication account request message and processes the message to validate the requesting wireless device 501 or 502 at step 603. The validation process includes performing a lookup operation to compare an identification associated with the wireless device 501 or 502 with a list of valid wireless device identifications. Responsive to an affirmative validation, the communication account system 500 processes the communication account request message to associate a communication account with the requesting wireless device 501 or 502 at step 604. If the requesting device is wireless device 501, the type of communication account that would be associated could be determined by the communication account system 500 based on the type of account desired by the user 104. In this case the type of account would be included in user information provided by the wireless device 501 in the request message. If the requesting device is wireless device 502, the type of communication account associated could be determined by a service agreement between the promotion sponsor and the communication account system 500.

Responsive to associating the communication account with the requesting device 501 or 502, the communication account system 500 transmits a response message to the requesting device 501 or 502 indicating the account information at step 605. The requesting wireless device 501 or 502 provides the account information to the user at step 606 and the operation ends at step 607.

Figure 7:
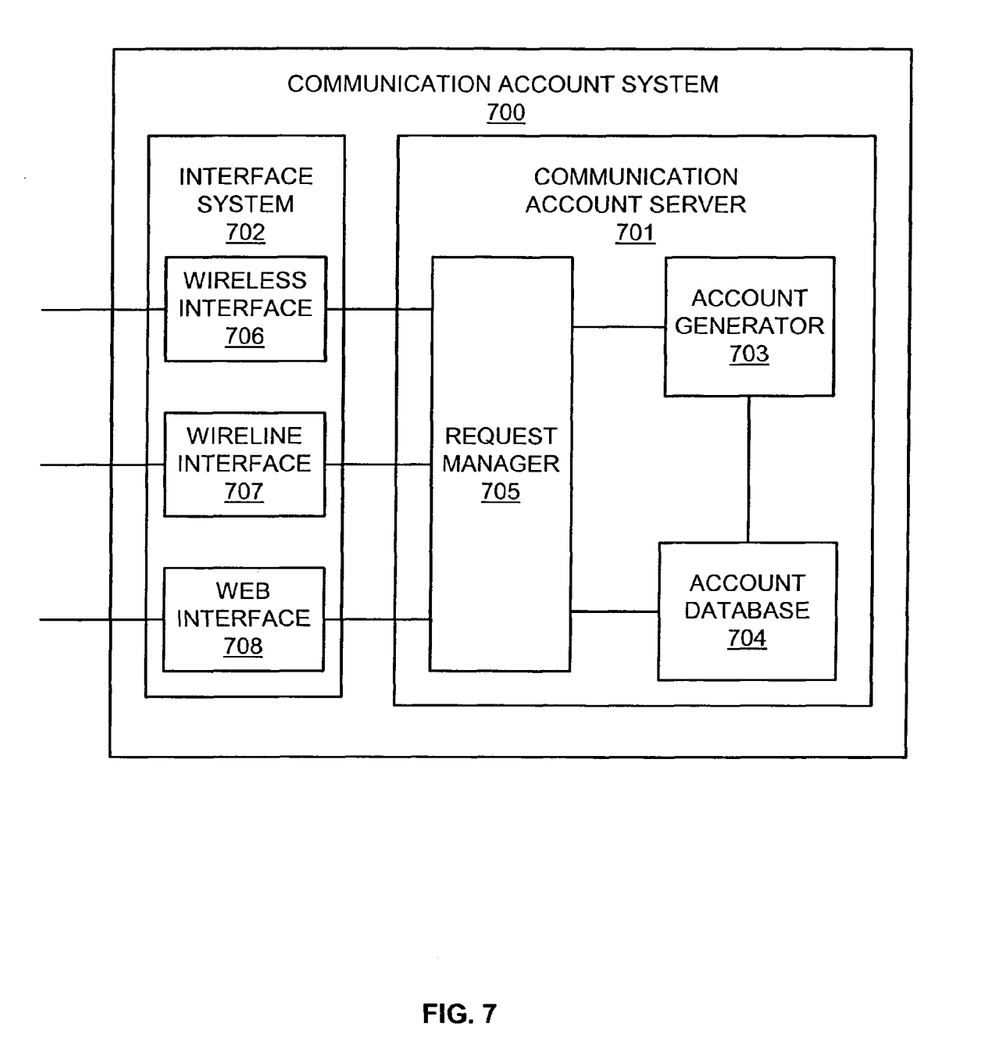
FIG. 7 is an example of a communication account system according to the present invention.
Figure 8:
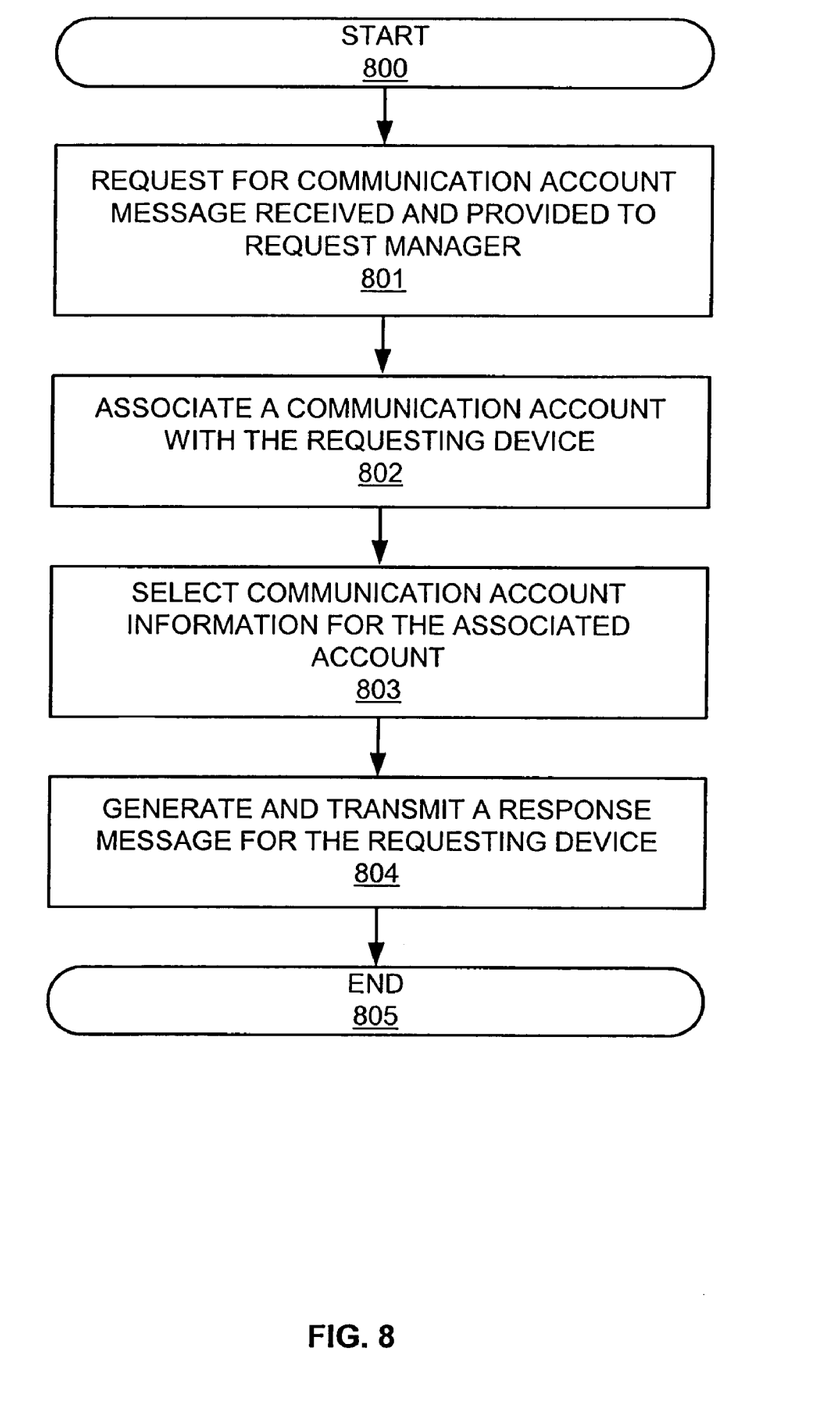
FIG. 8 is a flow chart illustrating another example of the operational steps of a communication account system according to the present invention.

The Communication Account System FIGS. 7-8:

FIG. 7 illustrates an example of a communication account system according to the present invention. Those skilled in the art will appreciate numerous variations that do not depart from the present invention. Those skilled in the art will also appreciate that various features described below could be combined with the above described embodiment to form multiple variations of the invention.

The communication account system 700 comprises a communication account server 701 and an interface system 702. The communication account server 701 comprises a request manager 705, an account generator 703, and an account database 704. The interface system 702 comprises a wireless interface 706, a wireline interface 707, and a web interface 708. The request manager 705 is connected to the wireless interface 706, the wireline interface 707, the web interface 708, the account generator 703, and the account database 704.

The request manager 705 could be any device or group of devices configured to receive a communication account request message from one of the wireless interface 706, the wireline interface 707, and the web interface 708, process the communication account request message to associate a communication account with a requesting device, and generate a response message for the requesting device that indicates communication account information. The request manager 705 uses the account generator 703 and the account databases 704 to associate the communication account and provide the communication account information to the requesting communication device.

The account database 704 could be any device or group of devices configured to store records associated with users of the requesting communication device, store records associated with the requesting communication device, and store communication account information for a plurality of account types. The account generator 703 could be any device or group of devices configured to generate communication account information for the request manager 705 and/or the account database 704.

FIG. 8 is a flow chart illustrating an example of the operation of the communication account system 700 according to the present invention. On FIG. 8 the operation begins at step 800. At step 801, a communication account request message is received by one of the wireless interface 706, the wireline interface 707, or the web interface 708, and is provided to the request manager 705. The request manager 705 processes the communication account request message to associate a communication account with a requesting device at step 802. In response to the association, the request manager 705 selects communication account information for the associated account type from the account database 704 at step 803. Alternatively, the request manager 705 could use the account generator 703 to generate the communication account information for the associated communication account. Responsive to associating a communication account, the request manager 705 generates and transmits a response message for the requesting device using one of the wireless interface system 706, the wireline interface system 707, or the web interface system 708 at step 804, and the operation ends at step 805. The response message indicates the communication account information to the requesting communication device.

The above-described systems could include instructions that are stored on storage media. The instructions could be retrieved and executed by a processor. Some examples of these instructions are software, program code, and firmware. Some examples of the storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of providing communication accounts to end users from a plurality of web sites, the method comprising:
   in a first web site of the plurality of web sites, transferring a first communication account request over an internet to an account server in response to a first transaction between a first end user of the end users and the first web site;
   in the account server, validating the first web site in response to receiving the first communication account request, selecting a first account code for the first end user in response to validating the first web site, and transferring the first account code over the internet to the first web site;
   in the first web site, transferring the first account code over the internet to the first end user, wherein the first end user uses the first account code to obtain a first communication service from a communication service provider;
   in a second web site of the plurality of web sites, transferring a second communication account request over the internet to the account server in response to a second transaction between a second end user of the plurality of end users and the second web site;
   in the account server, validating the second web site in response to receiving the second communication account request, selecting a second account code for the second end user in response to validating the second web site, and transferring the second account code over the internet to the second web site; and
   in the second web site, transferring the second account code over the internet to the second end user, wherein the second end user uses the second account code to obtain a second communication service from the communication service provider.

2. The method of claim 1 wherein the first communication service comprises a prepaid communication service.

3. The method of claim 1 wherein the first communication service comprises a wireless communication service.

4. The method of claim 1 wherein the first communication service comprises an internet access service.

5. The method of claim 1 wherein the first account code comprises a Personal Identification Number (PIN).

6. The method of claim 1 wherein the first account code comprises a password.

7. The method of claim 1 wherein the first communication account request identifies the first end user and the second communication account request identifies the second end user.

8. The method of claim 1 wherein the first communication account request identifies a first monetary amount and the second communication account request identifies a second monetary amount.

9. The method of claim 1 further comprising, in the account server, selecting a first monetary amount for the first account code and selecting a second monetary amount for the second account code.

10. The method of claim 1 further comprising, in the account server, selecting a first time amount for the first account code and selecting a second time amount for the second account code.

11. A system to provide communication accounts to end users, the system comprising:
- a first web server configured to transfer a first communication account request over an internet to an account server in response to a first transaction between a first end user of the end users and the first web server;
- a second web server configured to transfer a second communication account request over the internet to the account server in response to a second transaction between a second end user of the end users and the second web server;
- the account server configured to validate the first web server in response to receiving the first communication account request, select a first account code for the first end user in response to validating the first web server, transfer the first account code over the internet to the first web server, validate the second web server in response to receiving the second communication account request, select a second account code for the second end user in response to validating the second web server, and transfer the second account code over the internet to the second web server;
- the first web server further configured to transfer the first account code over the internet to the first end user, wherein the first end user uses the first account code to obtain a first communication service from a communication service provider; and
- the second web server further configured to transfer the second account code over the internet to the second end user, wherein the second end user uses the second account code to obtain a second communication service from the communication service provider.

12. The system of claim 11 wherein the first communication service comprises a prepaid communication service.

13. The system of claim 11 wherein the first communication service comprises a wireless communication service.

14. The system of claim 11 wherein the first communication service comprises an internet access service.

15. The system of claim 11 wherein the first account code comprises a Personal Identification Number (PIN).

16. The system of claim 11 wherein the first account code comprises a password.

17. The system of claim 11 wherein the first communication account request identifies the first end user and the second communication account request identifies the second end user.

18. The system of claim 11 wherein the first communication account request identifies a first monetary amount and the second communication account request identifies a second monetary amount.

19. The system of claim 11 wherein the account server is further configured to select a first monetary amount for the first account code and select a second monetary amount for the second account code.

20. The system of claim 11 wherein the account server is further configured to select a first time amount for the first account code and select a second time amount for the second account code.

* * * * *